July 6, 1943. P. D. MERRILL 2,323,482
GASKET RETAINING RING
Filed June 10, 1940
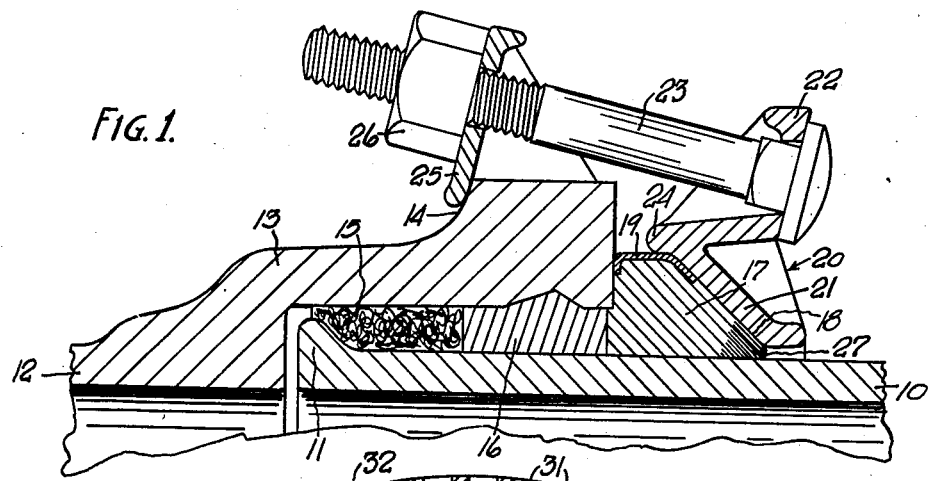
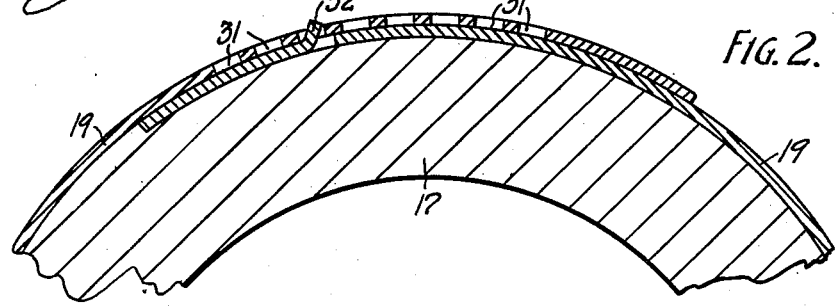
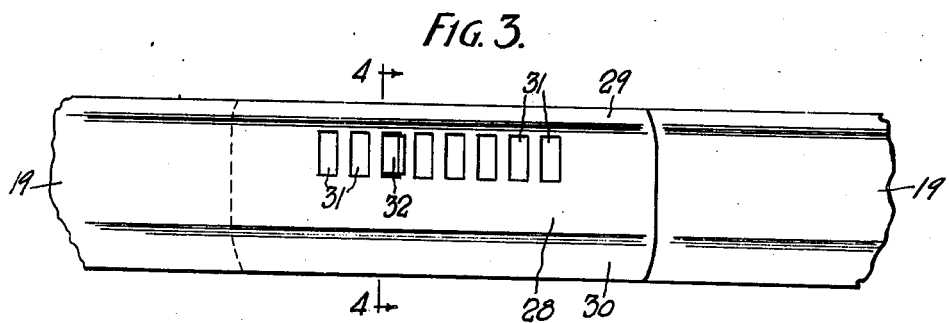
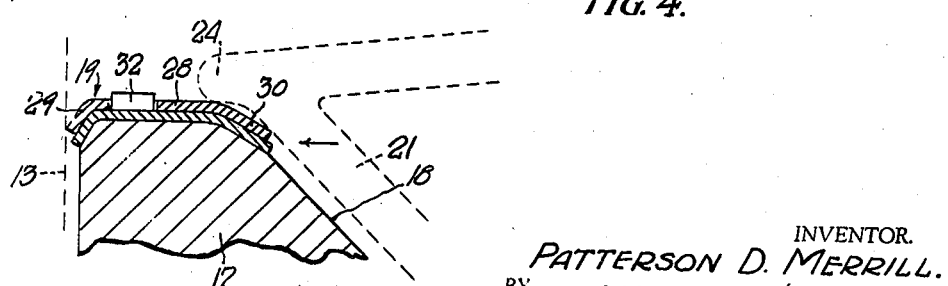
INVENTOR.
PATTERSON D. MERRILL.
BY Oltsch & Knoblock
ATTORNEYS.

Patented July 6, 1943

2,323,482

UNITED STATES PATENT OFFICE 2,323,482

GASKET RETAINING RING

Patterson D. Merrill, South Bend, Ind., assignor to M. B. Skinner Company, South Bend, Ind., a corporation of Indiana Application June 10, 1940, Serial No. 339,707

2 Claims. (Cl. 285—119)

This invention relates to gasket retaining rings, and more particularly to a ring for retaining the gasket utilized for sealing a leak at a pipe coupling. The gasket of the conventional pipe leak sealing device comprises a rubber or other resilient ring which is seated against a pipe joint at which a leak occurs, and is pressed firmly against the leaking area. Leak sealing devices of this character usually employ at least one shiftable gasket compressing clamp member drawn toward an opposing clamp member for the purpose of compressing the gasket. However, inasmuch as it is necessary that the two clamp parts be spaced from each other in order to permit relative movement thereof, it becomes necessary to employ a retainer ring encircling the gasket and spanning the portion of the gasket which is not confined in order to prevent the gasket from extruding or expanding in a direction away from the leaking area against which it is desired that the gasket be pressed. One form of pipe joint sealing means to which my invention is applicable is shown in my prior Patent No. 1,994,527, dated March 19, 1935.

The gasket retaining ring usually employed with pipe joint sealing devices is formed from a strip of sheet metal bent circularly with its ends overlapping. The ring is transversely bent to substantially or at least partially conform to the configuration of the outer surface of the gasket, and also to seat against or under the clamp parts. The shiftable part or follower of a clamp is usually provided with a tapered gasket engaging and compressing face, and this requires that at least a part of the retaining ring be bent transversely to seat thereagainst or thereunder. Such transverse bending of the retainer ring tends to twist the same out of true, so that the ends of the ring usually will not maintain desired overlapping relation, nor effectively seat on a gasket without being held in place.

Hence the assembly of a leak sealing device and its application to a leaking pipe is difficult, since the operator must hold the retaining ring in operative position on the gasket while applying the clamp parts in operative relation thereto. The parts of the clamps of devices for sealing leaks in large pipes are heavy, and are difficult to manipulate with one hand for that reason. Likewise, it is necessary that the anchor and follower ring of a leak sealing device be held in operative relation while the draw bolts therebetween are being applied. To do this with one hand while the other hand holds the retaining ring in place is very difficult.

Therefore, it is the primary object of this invention to provide a gasket retaining ring formed of a circularly bent metal strip with means for locking it in ring form, which means are releasable to accommodate reduction of the diameter of the ring incident to the application of gasket compressing force by clamp members.

A further object is to provide a gasket retaining ring having overlapping ends provided with adjustable locking means having a plurality of locking positions, said means being self-adjusting to accommodate reduction of the ring diameter incident to tightening of a clamp applying pressure to the gasket being retained.

A further object is to provide a novel, simple and inexpensive construction of gasket retaining ring.

Other objects will be apparent from the description and appended claims.

In the drawing:

Fig. 1 is a fragmentary longitudinal sectional view of a bell and spigot pipe joint having a sealing clamp applied thereto, and provided with my improved gasket retaining ring.

Fig. 2 is an enlarged fragmentary radial sectional view of an annular gasket having my improved gasket retaining ring applied thereto.

Fig. 3 is an enlarged fragmentary view illustrating the overlap of the ends of the ring forming member in side elevation.

Fig. 4 is a transverse sectional view of the overlapped portions of a gasket retainer ring as applied to an annular gasket, with certain of the parts associated therewith in a leak sealing device illustrated fragmentarily in dotted lines.

Referring to the drawing which illustrates the preferred embodiment of the invention, the numeral 10 designates a pipe section having a spigot end 11, and 12 designates a complementary pipe section having a bell 13 fitting around the spigot 11 of pipe section 10, and provided with an outwardly flared end portion 14. Suitable packing material 15, such as hemp or oakum, is tightly packed in the joint between the spigot 11 and bell 13, and lead 16 is poured in the outer end of the annular space between the bell and spigot to retain the packing 15. While the packing materials 15 and 16 usually are effective to prevent leakage at the pipe joint between adjacent pipe sections 10 and 12, leakage frequently occurs at this joint and it becomes necessary to provide a seal for such leakage.

For this purpose an annular gasket 17 is seated against the end of the bell 13 and upon the pipe section 10, said gasket 17 preferably having an inclined face 18 opposite the face thereof which engages bell 13. A retaining ring 19 is applied around the outer circumference of the gasket 17. A follower ring 20 is provided with an inclined or tapered web or wall 21 which is adapted to seat against the gasket face 18, and is provided also with suitable outwardly projecting ears 22 having openings therein for the reception of draw bolts 23. The follower ring also preferably includes a flat lip or flange 24 at the outer or large diameter portion of the wall 21 adapted to overlie the outer side or portion of the ring 19. An anchor ring 25 is seated against the flared portion 14 of bell 13 and has openings therein through which bolts 23 may pass. Suitable nuts 26 threaded on bolts 23 press against ring 25 and serve to draw the follower ring 20 in the direction of the bell 13 to compress the gasket 17. The gasket is preferably provided with an annular portion 27 of much harder composition than the remainder thereof at the inner acute-angled part of the outer side thereof, whereby the gasket is prevented from extruding between the pipe 10 and the inner edge of the follower ring 20.

The construction as described up to this point is substantially the same as that illustrated and described in my prior Patent No. 1,994,527. My improvement relates to the construction of the gasket retaining ring 19. As best illustrated in Figs. 2, 3 and 4, this gasket ring 19 comprises a strip of thin sheet metal bent circularly with its ends overlapping. The strip is also bent transversely to provide an intermediate substantially flat portion 28, one side portion or flange 29 of narrow width which is bent inwardly at an angle of 45 degrees or more, and an opposite side portion or flange 30 of greater width than portion 29 bent at an angle substantially less than portion 29.

It will readily be observed that, by reason of the transverse configuration of the ring 19 as above described, the material of which it is formed tends to twist out of a true alignment, so that the opposite ends intended to overlap are positioned out of registration with each other and can be held in register only by means overcoming the twisting stress inherent therein. For the purpose of so holding the overlapping ends in register, I provide a series of equi-spaced circumferentially aligned openings 31 in the central portion 28 of the ring adjacent the overlapping end thereof. The openings 31 are preferably formed close to the flange 29 and substantially spaced from the flange 30 of the ring. Adjacent the overlapping end of the ring I form an outwardly angularly directed tab or tongue 32 of a size to fit freely but fairly snugly within any one of the apertures 31. Tab 32 extends at an acute angle from the ring in a direction opposite from the adjacent end of the ring.

Therefore, referring particularly to Fig. 4, it will be seen that when the ring 19 is to be applied to a gasket 17, its overlapping ends may be locked against separation by the seating of tab 32 in one of the apertures 31 of the overlapping end. By virtue of the inclination of the tongue 32 in a direction opposite the adjacent end of the overlapped part, the ring 19 may be manually tightened and adjusted to a size corresponding to the size of the gasket with the tongue 32 seating in successive apertures 31 during the tightening operation. The tongue or tab 32 will obviously prevent the ring from springing laterally incident to the torque inherent therein from the manner in which the same is transversely bent. The annular gasket 17 is severed to permit its application to a pipe, and hence the retaining ring serves the additional function of holding said gasket in ring form. Thus it is possible for an operator who is applying a sealing device to a leaking pipe, to apply the annular gasket to the pipe, and then to apply and adjustably lock the gasket retaining ring thereover to hold said parts operatively with respect to the pipe. Thereafter the operator is free to assemble and apply the anchor ring 25 and the follower ring 20 to the pipe, and to position said rings in operative relation to each other, to the pipe joint, and to the gasket. Also the operator can thereafter easily apply the draw bolts 23 and tighten them by means of the bolts 26, all without necessity of handling or holding the gasket retainer 19 as has heretofore been necessary.

It will be seen that while the interlock 31, 32 of the ends of the gasket retainer holds the same in ring form and in operative relation to the gasket 17, it also permits the ring 19 to assume a reduced diameter size incident to tightening of the nuts 26 on the draw bolts 23. The pull of draw bolts 23 on the follower ring 20 is applied by said follower ring against the tapered face 18 of the gasket 17 to compress said gasket transversely and also radially inwardly, and thereby reduce both the transverse dimension and the outer circumference of the gasket ring. This action is applied also to the gasket retaining ring by virtue of the fact that the portion 30 thereof is pressed upon by the tapered wall 21 of the follower ring, and further by virtue of the fact that the ring is partially overlapped by the flange 24 of the follower ring.

Inasmuch as the interlock 31, 32 is positioned adjacent the flange 29, sufficient space is provided between the same and the flange 24 of the follower ring to prevent interference with said interlock by said flange 24. Hence as the diameters of the gasket and the retaining ring tend to be reduced incident to the application of pressure by the follower ring, the tongue 32 is permitted to snap out of one aperture 31 and to seat against the next succeeding aperture automatically and in full response to the extent of reduction of circumferential dimension thereof.

Also, it will be noted that the positioning of the tongue 32 and the slots 31 transversely of the ring as best illustrated in Fig. 4 permits the flange 29 to be bent at substantially right angles to the central part 28 of the ring, and further permits the flange 30 to be bent to an angle conforming to that of the tapered wall 21 of the follower ring, all without interference with the operation of the interlock.

From the foregoing it will be seen that this improved gasket retaining ring constitutes a very simple device, which overcomes substantial difficulties heretofore experienced with such rings, which permits the same to be locked in place upon an uncompressed ring and thereafter to be shifted to a reduced circumference dimension. Hence the construction is fully operable for its intended purpose and possesses no substantial disadvantage for this purpose. Also, it greatly simplifies the operation of applying a leak sealing clamp to a pipe coupling both from the standpoint of effort and time consumed therein. It will be understood that the type of interlock here specifically described and shown is illustrative only, and that interlocks of different types structurally and functionally equivalent to that here described may be employed with equal facility and advantage.

I claim:

1. In combination, a compressible annular gasket adapted to encircle a pipe, a resilient strip bent circularly with its ends overlapping to form a ring encircling said gasket, one end of said strip having a series of longitudinally spaced apertures therein and the other end having a tongue projecting angularly therefrom and adapted to seat in one of said apertures, to lock said strip ends together, and means for laterally compressing said gasket including a part having a conical surface engaging said gasket and ring to reduce the diameter of said gasket and ring, said tongue flexing to seat in successive apertures during tightening of said compressing means, the component of radial expansion of said gasket normally urging said tongue in locking engagement with the aperture in which it seats.

2. The combination defined in claim 1, wherein said strip is provided with circumferential flanges at its sides adapted to be transversely bent by said compressing means, said apertures and tongue being positioned intermediate said flanges.

PATTERSON D. MERRILL.